United States Patent
Koeppel et al.

(10) Patent No.: US 9,990,632 B1
(45) Date of Patent: Jun. 5, 2018

(54) DYNAMIC MODIFICATION OF A VERIFICATION METHOD ASSOCIATED WITH A TRANSACTION CARD

(71) Applicant: Capital One Services, LLC, McLean, VA (US)

(72) Inventors: Adam Koeppel, Washington, DC (US); Robert Perry, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/793,667

(22) Filed: Oct. 25, 2017

(51) Int. Cl.
*G06Q 20/40* (2012.01)
*G06Q 20/34* (2012.01)
*G06Q 20/32* (2012.01)
*H04W 12/06* (2009.01)

(52) U.S. Cl.
CPC ......... *G06Q 20/405* (2013.01); *G06Q 20/325* (2013.01); *G06Q 20/3224* (2013.01); *G06Q 20/3278* (2013.01); *G06Q 20/34* (2013.01); *G06Q 20/352* (2013.01); *G06Q 20/4012* (2013.01); *H04W 12/06* (2013.01)

(58) Field of Classification Search
CPC ............... G06Q 20/405; G06Q 20/325; G06Q 20/4012; G06Q 20/352; G06Q 20/3224; G06Q 20/34; G06Q 20/3278; H04W 12/06
See application file for complete search history.

(56) References Cited

U.S. PATENT DOCUMENTS

| | | |
|---|---|---|
| D651,237 S | 12/2011 | Mullen et al. |
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |

(Continued)

*Primary Examiner* — Sonji Johnson
(74) *Attorney, Agent, or Firm* — Harrity & Harrity, LLP

(57) ABSTRACT

A device may determine that a verification method associated with a transaction card is to be modified from a first verification method to a second verification method. The first verification method and the second verification method may use different types of verification information. The device may provide a set of instructions to the transaction card after determining that the verification method is to be modified. The set of instructions may cause the transaction card to modify the verification method from the first verification method to the second verification method. The device may provide information identifying a modification to the verification method to a transaction backend device to notify the transaction backend device that the verification method associated with the transaction card has been modified from the first verification method to the second verification method.

20 Claims, 8 Drawing Sheets

(56) References Cited

U.S. PATENT DOCUMENTS

| | | |
|---|---|---|
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 2004/0155101 A1* | 8/2004 | Royer .................... G06Q 20/04 235/379 |
| 2009/0143104 A1 | 6/2009 | Loh et al. |
| 2009/0159698 A1* | 6/2009 | Mullen ............ G06K 19/06206 235/493 |
| 2011/0140841 A1 | 6/2011 | Bona et al. |
| 2012/0123937 A1 | 5/2012 | Spodak |
| 2013/0200999 A1 | 8/2013 | Spodak et al. |
| 2014/0279476 A1 | 9/2014 | Hua |

\* cited by examiner

DYNAMIC MODIFICATION OF A VERIFICATION METHOD ASSOCIATED WITH A TRANSACTION CARD

BACKGROUND

A transaction card may be associated with a technical standard for operating and/or processing transactions. In addition, a transaction card may store data on an integrated circuit and/or a magnetic strip. Further, the transaction card may be associated with a verification method, such as a chip and personal identification number (PIN) method or a chip and signature method. With the chip and PIN method, a user of a transaction card may input a PIN (e.g., a multiple digit number) into a transaction terminal to complete a transaction. With the chip and signature method, a user of a transaction card may sign a receipt or a signature pad associated with a transaction terminal to complete a transaction.

SUMMARY

According to some possible implementations, a device may include one or more memories, and one or more processors, communicatively coupled to the one or more memories, to determine that a verification method associated with a transaction card is to be modified from a first verification method to a second verification method. The first verification method and the second verification method may use different types of verification information. The one or more processors may provide a set of instructions to the transaction card after determining that the verification method is to be modified. The set of instructions may cause the transaction card to modify the verification method from the first verification method to the second verification method. The one or more processors may provide information identifying a modification to the verification method to a transaction backend device to notify the transaction backend device that the verification method associated with the transaction card has been modified from the first verification method to the second verification method.

According to some possible implementations, a non-transitory computer-readable medium may store one or more instructions that, when executed by one or more processors, cause the one or more processors to determine that a verification method, used to verify transactions of a transaction card, is to be reconfigured from a first verification method to a second verification method. The second verification method may include a chip and personal identification number (PIN) method, or a chip and signature method. The one or more instructions, when executed by the one or more processors, may cause the one or more processors to provide a set of instructions to the transaction card to cause the transaction card to reconfigure from the first verification method to the second verification method. The set of instructions may be provided to the transaction card via a wireless connection between the transaction card and a device associated with the transaction card, or a transaction backend device. The one or more instructions, when executed by the one or more processors, may cause the one or more processors to provide information to the transaction backend device to notify the transaction backend device that the verification method used to verify the transactions of the transaction card has been reconfigured to the second verification method.

According to some possible implementations, a method may include determining, by a device, that a verification method, used to verify a user of a transaction card, is to be enabled or disabled based on at least one of: transaction terminal information, indicating whether a transaction terminal is capable of using the verification method, or transaction backend information, indicating whether the verification method is capable of completing the transaction. The method may include providing, by the device, a set of instructions to the transaction card after determining that the verification method is to be enabled or disabled. The set of instructions may cause the transaction card to enable or disable the verification method. The method may include providing, by the device, information to a transaction backend device to notify the transaction backend device that the verification method associated with the transaction card has been enabled or disabled.

DETAILED DESCRIPTION

The following detailed description of example implementations refers to the accompanying drawings. The same reference numbers in different drawings may identify the same or similar elements.

A transaction card may be configured to use a particular verification method, such as a chip and personal identification number (PIN) method or a chip and signature method. A user of the transaction card may want to toggle the transaction card between various verification methods. For example, a user of a transaction card may want to modify the transaction card from one verification method to another verification method when travelling to a particular geographic location, based on a user preference, and/or the like. Some transaction cards may not permit a user to toggle between verification methods. In addition, different verification methods may use different communication protocols. This may prevent a transaction card that uses one verification method from being able to properly transfer information in a different geographic location, such as with a transaction terminal using a different communication protocol, and/or the like that is associated with another verification method.

Some implementations, described herein, provide a user device that is capable of permitting a user to modify a transaction card from using one verification method to using another verification method via a wireless connection between the user device and the transaction card. In this way, the user device permits quick and easy re-configuration of the transaction card. This increases an efficiency of modifying the verification method that a transaction card uses by reducing or eliminating a need for a user to contact an organization associated with the transaction card and/or by reducing or eliminating a need for the user to obtain a replacement transaction card that uses a particular verification method. In addition, this conserves network resources and/or computing resources that would otherwise be consumed by providing the user with a new transaction card that uses a particular verification method. Further, this reduces or eliminates issues associated with using a transaction card in different locations, with different merchants, and/or the like that use different verification methods (e.g., issues associated with a rejected transaction, a locked account, etc.).

Figure 1:
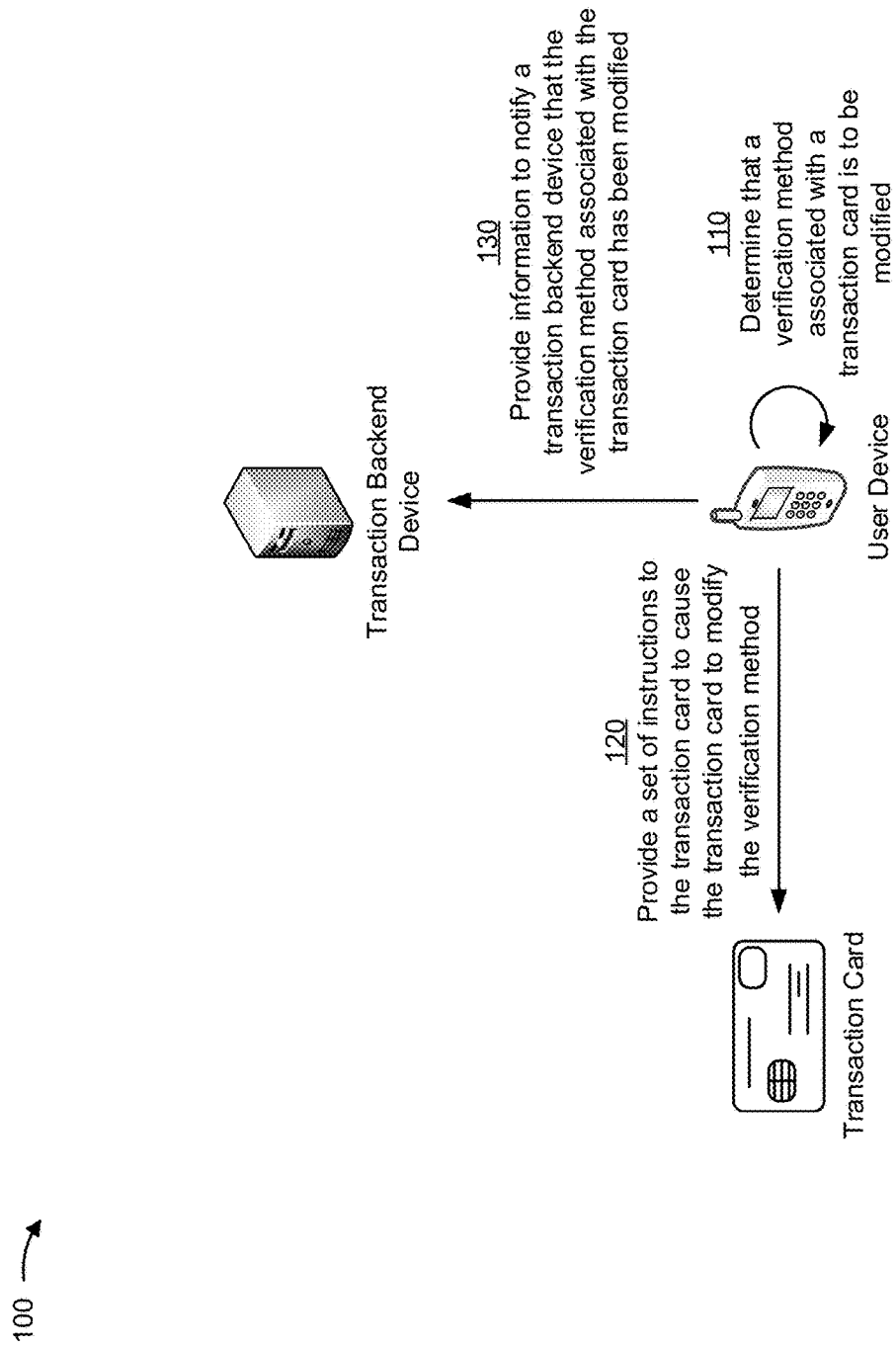
FIG. 1 is a diagram of an overview of an example implementation described herein.

FIG. 1 is a diagram of an overview of an example implementation 100 described herein. As shown in FIG. 1, example implementation 100 may include a transaction card, a user device, and a transaction backend device.

As shown in FIG. 1, and by reference number 110, the user device may determine that a verification method associated with a transaction card is to be modified. For example, the user device may determine that a verification method associated with the transaction card is to be modified based on input from a user of the user device, based on detecting a geographic location of the transaction card and/or the user device, based on a user preference of a user associated with the user device and/or the transaction card, based on a particular time of day or day of the week, based on a quantity of people that can use the transaction card (e.g., when multiple people associated with an organization have access to the transaction card), and/or the like.

The user device may determine a verification method to configure the transaction card to use, a verification method to disable or enable, and/or the like. For example, the user device may determine a verification method to use based on input from a user of the user device, using a data structure (e.g., to look up a verification method to use), based on a verification method that the transaction card is currently using, based on a verification method used by a transaction terminal to which the transaction card is connected, and/or the like.

As shown by reference number 120, the user device may provide a set of instructions to the transaction card to cause the transaction card to modify the verification method that the transaction card is using. For example, the set of instructions may cause the transaction card to configure to use a particular verification method, to enable a particular verification method, to disable a particular verification method, and/or the like. The user device may provide the set of instructions after determining the verification method to configure the transaction card to use.

After receiving the set of instructions, the transaction card may configure to use the verification method, may enable or disable a verification method, and/or the like. In addition, the transaction card may verify that the transaction card can use the verification method and/or that the transaction card is to modify the verification method (e.g., by communicating with the user device via a wireless connection to request confirmation of the modification, by communicating with the transaction backend device to confirm that the transaction card is permitted to use the verification method, etc.). For example, the transaction card may send a message to the user device for display (e.g., via a wireless connection between the transaction card and the user device) to request confirmation of the modification, may communicate with the transaction backend device to confirm that a user account associated with the transaction card has been configured to support the verification method (e.g., that a user has configured a PIN for use with a chip and PIN configuration method, that a user has configured biometric information for use with a biometric verification method, etc.), and/or the like.

This conserves computing resources of the transaction card and/or the transaction backend device by reducing or eliminating erroneous configurations of verification methods and/or by reducing or eliminating issues (e.g., rejected transactions, locked accounts, etc.) that would occur due to the transaction card, a transaction terminal, and/or the transaction backend device attempting to use a verification method that is not permitted.

As shown by reference number 130, the user device may provide information to notify a transaction backend device that the verification method associated with the transaction card has been modified. In addition, the user device may provide information to identify the verification method that the transaction card was configured to use. For example, the user device may provide the information to the transaction backend device after receiving a message from the transaction card indicating that the verification method was successfully modified. This conserves processing resources of a transaction backend device and/or a transaction terminal by reducing or eliminating errors associated with a mismatch between a verification method configured on a transaction card and information stored by the transaction backend device that identifies the verification method that the transaction card is configured to use.

In this way, a user device permits quick and easy configuration of a verification method for a transaction card by permitting a user to use the user device to communicate with the transaction card to modify the verification method. This increases an efficiency of re-configuring a transaction card to use a different verification method. In addition, this conserves network resources and/or computing resources that would otherwise be consumed by modifying the verification method in a less efficient manner, such as by contacting an organization to modify a verification method. Further, this reduces or eliminates issues associated with using a transaction card in different locations, with different merchants, and/or the like that use different verification methods, thereby conserving computing resources of devices associated with completing a transaction that would otherwise be consumed due to a mismatch between a verification method associated with the transaction card and a particular location, a particular merchant, and/or the like.

As indicated above, FIG. 1 is provided merely as an example. Other examples are possible and may differ from what was described with regard to FIG. 1.

Figure 2:
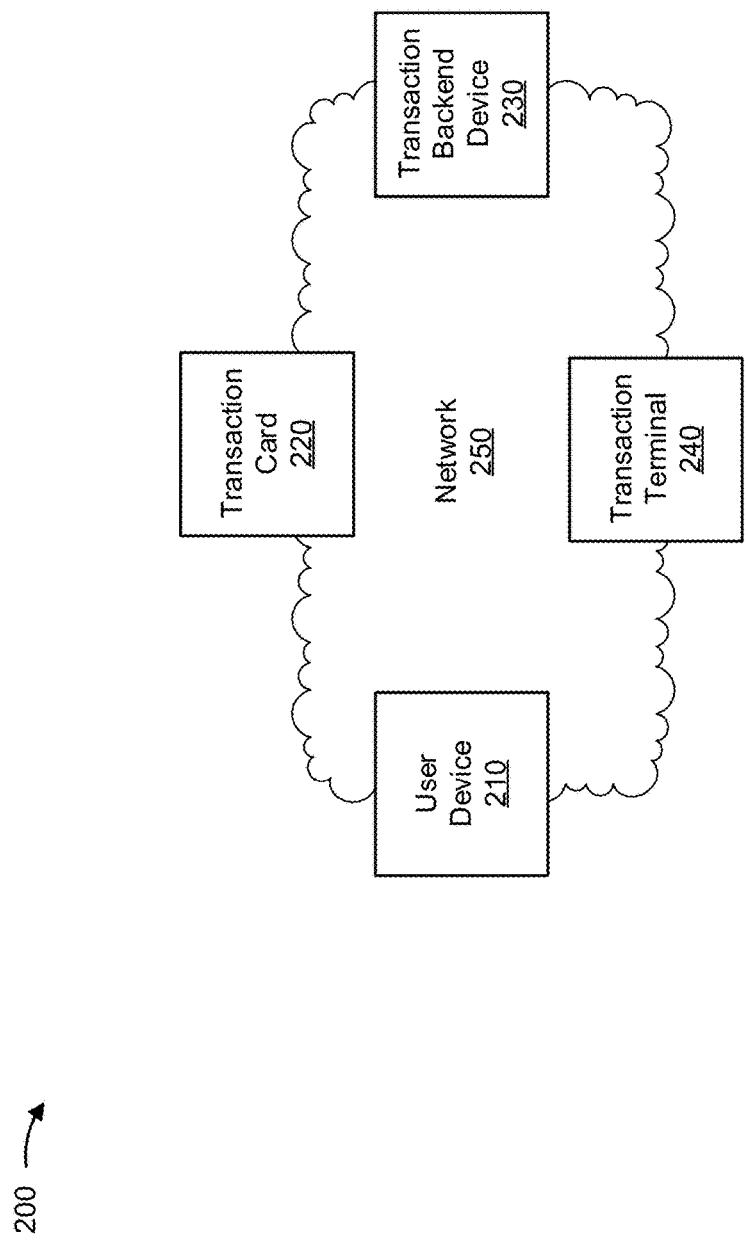
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230, a transaction terminal 240, and a network 250. Devices of environment 200 may interconnect via wired connections, wireless connections, or a combination of wired and wireless connections.

User device 210 includes one or more devices capable of receiving, generating, storing, processing, and/or providing information associated with modifying a verification method that transaction card 220 uses. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may determine to modify a verification method that transaction card 220 uses, as described elsewhere herein. Additionally, or alternatively, user device 210 may provide a set of instructions to transaction card 220 to cause transaction card 220 to use a particular verification method, as described elsewhere herein.

Transaction card 220 includes a transaction card that can be used to complete a transaction. For example, transaction card 220 may include a credit card, a debit card, a gift card, a payment card, an automated teller machine (ATM) card, a stored-value card, a fleet card, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip).

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may receive a set of instructions from user device 210 to modify a verification method that transaction card 220 is using, as described elsewhere herein. Additionally, or alternatively, transaction card 220 may modify a verification method that transaction card 220 is using based on the set of instructions, as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may store information that identifies a verification method associated with transaction card 220, as described elsewhere herein. Additionally, or alternatively, transaction backend device 230 may provide a set of instructions to transaction card 220 to modify a verification method that transaction card 220 is using, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240.

Transaction terminal 240 includes one or more devices capable of facilitating processing of a transaction associated with transaction card 220. For example, transaction terminal 240 may include a PoS terminal, a payment terminal (e.g., a credit card terminal, a contactless payment terminal, a mobile credit card reader, a chip reader, etc.), a security access terminal, an ATM terminal, and/or the like. In some implementations, transaction terminal 240 may detect a verification method that transaction card 220 is configured to use and may determine whether transaction card 220 is configured to use the same verification method as transaction terminal 240, as described elsewhere herein. Additionally, or alternatively, transaction terminal 240 may provide a message to transaction backend device 230 that transaction card 220 is configured to use a different verification method than transaction terminal 240, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a PIN, a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 by obtaining data wirelessly from transaction card 220 as transaction card 220 comes within communicative proximity of transaction terminal 240, such that the RF signal reader detects an RF signal from an RF antenna of transaction card 220.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
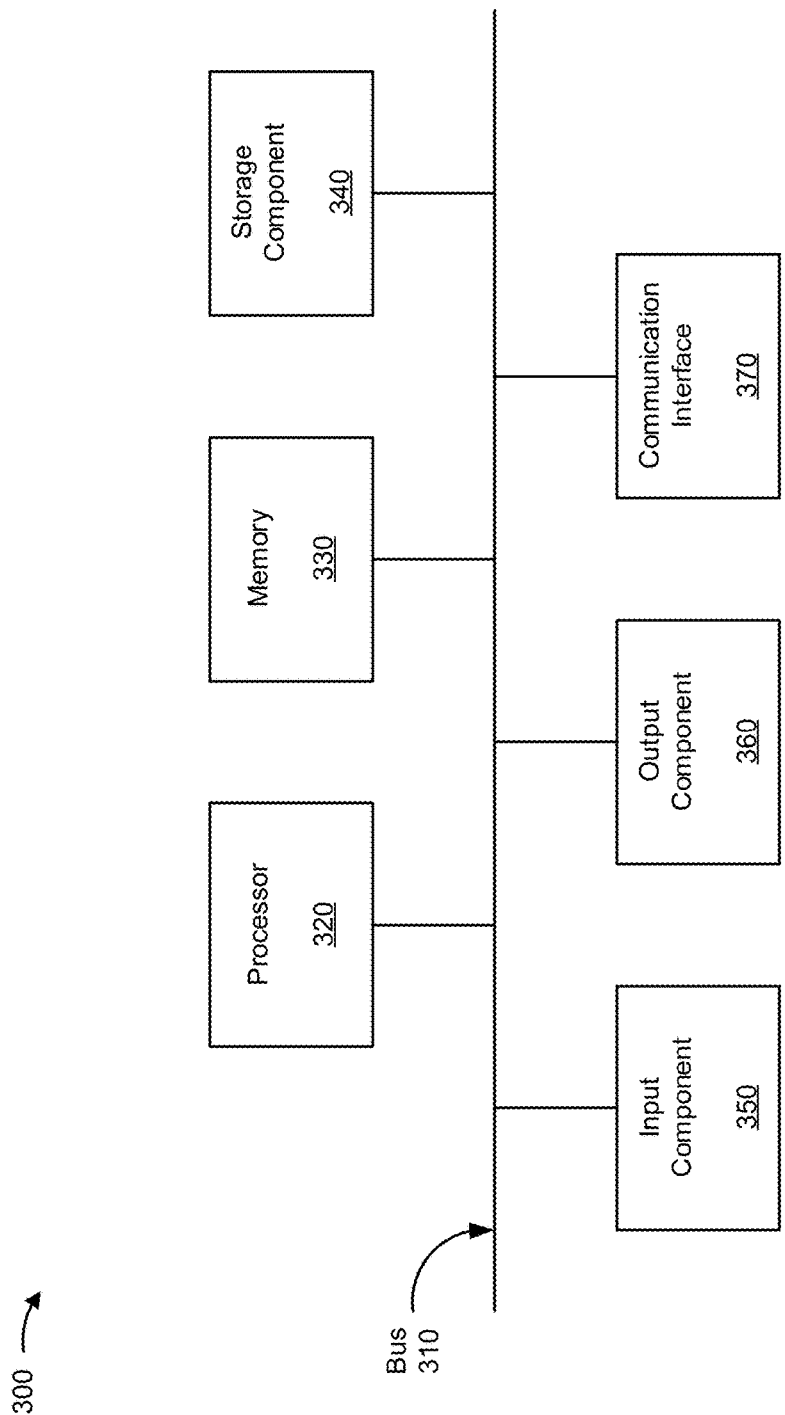
FIG. 3 is a diagram of example components of one or more devices of FIG. 2.

FIG. 3 is a diagram of example components of a device 300. Device 300 may correspond to user device 210, transaction card 220, transaction backend device 230, and/or transaction terminal 240. In some implementations, user device 210, transaction card 220, transaction backend device 230, and/or transaction terminal 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
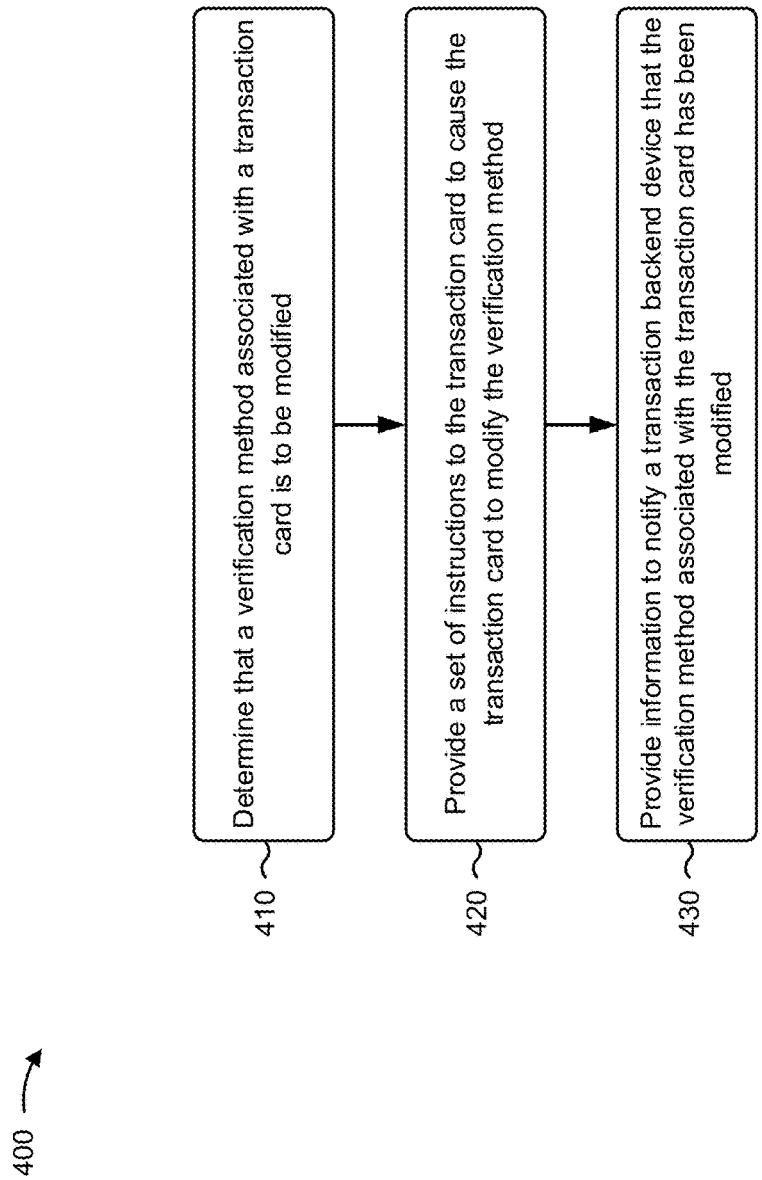
FIG. 4 is a flow chart of an example process for dynamic modification of a verification method associated with a transaction card.

FIG. 4 is a flow chart of an example process 400 for dynamic modification of a verification method associated with a transaction card. In some implementations, one or more process blocks of FIG. 4 may be performed by user device 210. In some implementations, one or more process blocks of FIG. 4 may be performed by another device or a group of devices separate from or including user device 210, such as transaction card 220, transaction backend device 230, and transaction terminal 240.

As shown in FIG. 4, process 400 may include determining that a verification method associated with a transaction card is to be modified (block 410). For example, user device 210 may determine that a verification method associated with transaction card 220 is to be modified.

In some implementations, a verification method may include a technique that is used to determine whether a user of transaction card 220 is a legitimate cardholder of transaction card 220. For example, a verification method may include a chip and PIN method, a chip and signature method, a biometric authentication method where, for example, biometric information (e.g., information that identifies a finger print, facial geometry, a retina and/or iris pattern, a deoxyribonucleic acid (DNA) sequence, etc.) is used to determine whether a user of transaction card 220 is a legitimate cardholder of transaction card 220, no verification method or a verification method that does not need input of information to authenticate a transaction, and/or the like. In some implementations, a verification method may be associated with a particular communication protocol that is used to provide information related to a transaction (e.g., to transaction backend device 230, transaction terminal 240, etc.). In some implementations, different verification methods may use different communication protocols.

In some implementations, user device 210 may determine that a verification method associated with transaction card 220 is to be modified based on input from a user of user device 210. For example, user device 210 may receive input from a user of user device 210 that indicates that a verification method associated with transaction card 220 is to be modified.

Additionally, or alternatively, user device 210 may determine that a verification method associated with transaction card 220 is to be modified based on a geographic location of user device 210 and/or transaction card 220 (e.g., when different verification methods are associated with different geographic locations). For example, user device 210 may detect a geographic location of user device 210 and/or transaction card 220 and may determine that a verification method associated with transaction card 220 is to be modified based on the geographic location.

Continuing with the previous example, user device 210 may determine that user device 210 and/or transaction card 220 is in a particular geographic location using a GPS component of user device 210 and/or determining that user device 210 is in communicative proximity of transaction card 220 (e.g., user device 210 and transaction card 220 being within communicative proximity may indicate that user device 210 and transaction card 220 are in the same geographic location). As another example, user device 210 may receive information identifying a location (e.g., a geographic location, a merchant location, etc.) of user device 210 and/or transaction card 220 and may identify a verification method to configure transaction card 220 to use based on the location of user device 210 and/or transaction card 220.

Additionally, or alternatively, user device 210 may determine that a verification method associated with transaction card 220 is to be modified based on receiving information from transaction card 220 and/or transaction backend device 230 that indicates that the verification method associated with transaction card 220 is different than a verification method associated with transaction terminal 240. For example, when transaction card 220 is within communicative proximity of transaction terminal 240, user device 210 may receive, from transaction backend device 230 and/or transaction terminal 240 (e.g., via transaction card 220), transaction terminal information that indicates a verification method associated with transaction terminal 240 (e.g., a verification method that transaction terminal 240 is capable of using), that a verification method associated with transaction card 220 does not match a verification method associated with transaction terminal 240, and/or the like.

Additionally, or alternatively, and as another example, user device 210 may determine that a verification method associated with transaction card 220 is to be modified based on transaction backend information. For example, transaction backend information may indicate whether the verification method associated with transaction card 220 is capable of completing a transaction for which transaction card 220 is being used.

In some implementations, user device 210 may determine that a verification method associated with transaction card 220 is to be modified based on receiving a request from transaction card 220. For example, user device 210 may receive, from transaction card 220, a request to modify a verification method associated with transaction card 220 after transaction card 220 is communicatively coupled to transaction terminal 240 and transaction card 220 and/or transaction terminal 240 determines that the verification method associated with transaction card 220 needs to be modified.

Additionally, or alternatively, user device 210 may determine that a verification method associated with transaction card 220 is to be modified based on a preference. For example, user device 210 may determine that a verification method associated with transaction card 220 is to be modified based on a user preference associated with a user of user device 210 and/or transaction card 220 (e.g., associated with an account associated with user device 210 and/or transaction card 220), a preference of a merchant with which transaction card 220 is being used to complete a transaction (e.g., associated with a merchant account associated with transaction terminal 240), and/or the like. Continuing with the previous example, if multiple individuals have permission to use transaction card 220, user device 210 may determine a user preference for a verification method when user device 210 detects that transaction card 220 is within communicative proximity of user device 210 (e.g., indicating that a user of user device 210 is to be a user of transaction card 220).

Additionally, or alternatively, user device 210 may determine to modify a verification method associated with transaction card 220 based on a particular day of the week, time of the day, and/or the like. For example, a user of user device 210 may use an electronic calendar associated with user device 210 to set a schedule for use of a particular verification method (e.g., for when the user is going to be travelling to a different geographic location) and user device 210 may determine to modify a verification method associated with transaction card 220 during the scheduled time period.

Additionally, or alternatively, user device 210 may determine to modify a verification method based on information indicating that an account associated with user device 210 and/or transaction card 220 has permission to modify the verification method. For example, user device 210 may receive information from transaction card 220 and/or transaction backend device 230 that indicates whether an account associated with user device 210 has permission to modify a verification method associated with transaction card 220.

Additionally, or alternatively, user device 210 may determine that a verification method associated with transaction card 220 is to be modified based on a purchase amount associated with a transaction (e.g., where the purchase amount satisfies a threshold). For example, a first threshold purchase amount may correspond to a first verification method and a second threshold purchase amount may correspond to a second verification method. Additionally, or alternatively, user device 210 may determine that a verification method associated with transaction card 220 is to be modified based on a type of merchant. For example, different verification methods may be associated with different types of merchants, such as a gas station, a retailer, a restaurant, a service provider, and/or the like.

Additionally, or alternatively, user device 210 may determine that a verification method associated with transaction card 220 is to be modified based on a type of transaction being completed. For example, different types of verification methods may be associated with different types of transactions, such as a cash back transaction, a cash withdrawal, a credit transaction, a debit transaction, and/or the like. Additionally, or alternatively, user device 210 may determine that a verification method associated with transaction card 220 is to be modified based on a quantity of transactions during a time period (e.g., based on the quantity of transactions satisfying a threshold). Additionally, or alternatively, user device 210 may determine that a verification method associated with transaction card 220 is to be modified such that the verification method associated with transaction card 220 matches the highest security verification method associated with transaction terminal 240 relative to other verification methods.

In some implementations, user device 210 may determine whether a modification to a verification method is approved. For example, user device 210 may request confirmation of the modification from a user of user device 210, may request that a user input authentication information (e.g., a PIN, a username and password combination, biometric information, etc.) to approve the modification, and/or the like, and may determine to modify the verification method based on the input.

In some implementations, user device 210 may determine whether transaction card 220 can use a particular verification method. For example, user device 210 may communicate with transaction card 220 and/or transaction backend device 230 to determine whether transaction card 220 can use a particular verification method and may determine to modify the verification method based on determining that transaction card 220 can use the particular verification method. This conserves computing resources that would otherwise be used to attempt to configure transaction card 220 to use a particular verification method that transaction card 220 cannot use.

In some implementations, user device 210 may determine a verification method to configure transaction card 220 to use by performing a lookup in a data structure. For example, user device 210 may perform a lookup of information that identifies a geographic location of user device 210 and/or transaction card 220, a user preference of a user device 210 and/or transaction card 220 (e.g., where a user preference prioritizes one verification method over another), a particular day of the week or time of the day, and/or the like and may identify a corresponding verification method when a result of the lookup indicates a match.

In some implementations, user device 210 may determine to modify a verification method when transaction card 220 is local to user device 210. For example, user device 210 may determine to modify a verification method when transaction card 220 is within communicative proximity of user device 210, is connected wirelessly to user device 210, is connected to a transaction terminal 240 that is at the same geographic location as user device 210, and/or the like. In some implementations, user device 210 may determine to communicate with transaction card 220 via a wireless connection between transaction card 220 and user device 210 when transaction card 220 is local to user device 210 (e.g., may provide a set of instructions, described elsewhere herein, to transaction card 220 via a wireless connection).

Additionally, or alternatively, user device 210 may determine to modify a verification method when transaction card 220 is remote to user device 210. For example, user device 210 may determine to modify a verification method when transaction card 220 is not within communicative proximity of user device 210, is not wirelessly connected to user device 210, and/or the like (e.g., when user device 210 is associated with a parent or an organization and transaction card 220 is associated with a child or an employee and the child or employee has traveled to a different geographic location than the parent or organization). In some implementations, user device 210 may determine to communicate with transaction card 220 via transaction backend device 230 when transaction card 220 is remote to user device 210 (e.g., may provide a set of instructions, described elsewhere herein, to transaction card 220 via transaction backend device 230).

In this way, user device 210 may determine to modify a verification method associated with transaction card 220 prior to user device 210 providing a set of instructions to transaction card 220 to modify the verification method.

As further shown in FIG. 4, process 400 may include providing a set of instructions to the transaction card to cause the transaction card to modify the verification method (block 420). For example, user device 210 may provide a set of instructions to transaction card 220 to modify the verification method. In some implementations, user device 210 may provide the set of instructions after determining to modify the verification method, after determining a verification method to configure transaction card 220 to use, based on user input from a user of user device 210 (e.g., based on input confirming modification of the verification method), via a wireless connection between user device 210 and transaction card 220, and/or the like. In some implementations, transaction card 220 may automatically modify a verification method associated with transaction card 220 (e.g., without receiving a set of instructions from user device 210 to modify the verification method).

In some implementations, a set of instructions may cause transaction card 220 to configure to use a verification method. For example, a set of instructions may cause transaction card 220 to configure from a first verification method to a second verification method that is different than the first verification method (e.g., that uses a different type of verification information). Additionally, or alternatively, a set of instructions may cause transaction card 220 to enable and/or disable various verification methods. For example, a set of instructions may cause transaction card 220 to enable a verification method, to disable a verification method, to enable a first verification method and to disable a second verification method, and/or the like.

Additionally, or alternatively, a set of instructions may cause transaction card 220 to use a particular protocol. For example, a set of instructions may modify transaction card 220 from using a first protocol to using a second protocol. In some implementations, a set of instructions may modify a verification method that an IC chip associated with transaction card 220 uses (e.g., a protocol that the IC chip uses).

In some implementations, user device 210 may determine whether user device 210 and transaction card 220 are within communicative proximity (e.g., whether user device 210 and transaction card 220 are connected wirelessly). In some implementations, user device 210 may determine to provide a set of instructions to transaction card 220 via a wireless connection between user device 210 and transaction card 220 when user device 210 and transaction card 220 are within communicative proximity. This conserves network resources, such as bandwidth, by reducing or eliminating a need for user device 210 to provide the set of instructions via network 250. In some implementations, user device 210 may prevent a set of instructions from being provided to transaction card 220 until user device 210 and transaction card 220 are within communicative proximity. This conserves computing resources of user device 210 that would otherwise be consumed attempting to provide a set of instructions to transaction card 220 when user device 210 and transaction card 220 are not within communicative proximity.

Additionally, or alternatively, user device 210 may determine to provide a set of instructions to transaction card 220 via transaction backend device 230 when user device 210 and transaction card 220 are not within communicative proximity. This improves a capability of user device 210 to provide a set of instructions to transaction card 220 by reducing or eliminating a need for user device 210 and transaction card 220 to be within communicative proximity.

In some implementations, user device 210 may provide a set of instructions to transaction card 220 after connecting to transaction card 220 (e.g., when transaction card 220 is within communicative proximity of user device 210). For example, a user of user device 210 may select a particular transaction card 220 to which to provide a set of instructions and user device 210 may connect to the particular transaction card 220 (e.g., using a security token, a password and username combination, and/or the like input by a user of user device 210, stored by user device 210, etc.) to permit user device 210 to provide the set of instructions to transaction card 220.

In some implementations, user device 210 may provide information to transaction card 220 to authenticate the set of instructions and/or to authorize the modification (e.g., authentication information). For example, user device 210 may provide a PIN input by a user of user device 210, information identifying a username and password combination of an account associated with user device 210 and/or transaction card 220, a security token, a key, and/or the like to transaction card 220 to authenticate the set of instructions and/or to authorize the modification of the verification method. In some implementations, user device 210 may provide information to authenticate a set of instructions and/or to authorize a modification to a verification method directly to transaction card 220 via a wireless connection between user device 210 and transaction card 220. Additionally, or alternatively, user device 210 may provide information to authenticate a set of instructions and/or to authorize a modification to a verification method via transaction backend device 230.

Additionally, or alternatively, user device 210 may provide information to verify a transaction for which transaction card 220 is being used (e.g., verification information), such as when user device 210 provides a set of instructions when transaction card 220 is connected to transaction terminal 240. For example, verification information may include a PIN, a signature, biometric information, and/or the like.

In some implementations, transaction card 220 may provide a message to user device 210 to confirm modification of the verification, to notify user device 210 of a successful modification, and/or the like. For example, transaction card 220 may provide a message to user device 210 directly when user device 210 and transaction card 220 are connected wirelessly. Additionally, or alternatively, and as another example, transaction card 220 may provide a message to user device 210 via transaction backend device 230 and transaction terminal 240 when user device 210 and transaction card 220 are not connected wirelessly.

In this way, user device 210 may provide a set of instructions to transaction card 220 prior to providing information to transaction backend device 230 to notify transaction backend device 230 of the modification to the verification method.

As further shown in FIG. 4, process 400 may include providing information to notify a transaction backend device that the verification method associated with the transaction card has been modified (block 430). For example, user device 210 may provide information to notify transaction backend device 230 that the verification method associated with transaction card 220 has been modified. In some implementations, user device 210 may provide the information to notify transaction backend device 230 after providing a set of instructions to transaction card 220, after receiving information confirming modification of the verification method from transaction card 220, based on input from a user of user device 210, and/or the like.

In some implementations, providing information to notify transaction backend device 230 conserves processing resources of transaction card 220, transaction backend device 230, and/or transaction terminal 240 that would otherwise be consumed by erroneous processing of transactions by permitting transaction backend device 230 to identify a manner in which to process a transaction and/or by permitting transaction backend device 230 to accurately identify a verification method associated with transaction card 220. In addition, this improves fraud prevention by causing transaction backend device 230 to properly process a transaction.

In some implementations, the information that user device 210 provides to transaction backend device 230 may identify the verification method that transaction card 220 was configured to use. Additionally, or alternatively, the information may include authentication information to authorize transaction backend device 230 to modify information identifying the verification method associated with transaction card 220 and/or verification information to permit transaction backend device 230 to verify and/or authorize a transaction.

In some implementations, transaction card 220, rather than user device 210, may provide information to transaction backend device 230 to notify transaction backend device 230. For example, transaction card 220 may provide the information to transaction backend device 230 via transaction terminal 240 when transaction card 220 is within communicative proximity of transaction terminal 240. This conserves processing resources of user device 210 by reducing or eliminating a need for user device 210 to provide this information.

In some implementations, user device 210 may update a log with a timestamp that identifies a date, a time, and/or the like of the modification of the verification method. Additionally, or alternatively, user device 210 may provide a generated report for display (e.g., via a display of user device 210) that identifies information related to the modification. Additionally, or alternatively, user device 210 may send a message to another user device 210 (e.g., associated with a primary account with which transaction card 220 is associated) to notify a primary account holder of the modification to the verification method. Additionally, or alternatively, user device 210 may store information related to the modification (e.g., a geographic location, a transaction type (e.g., a purchase, a transfer, charged against a line of credit, etc.), and/or the like to permit user device 210 to automatically modify the verification method for future transactions.

In this way, user device 210 may provide information to notify transaction backend device 230 that the verification method associated with transaction card 220 has been modified.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
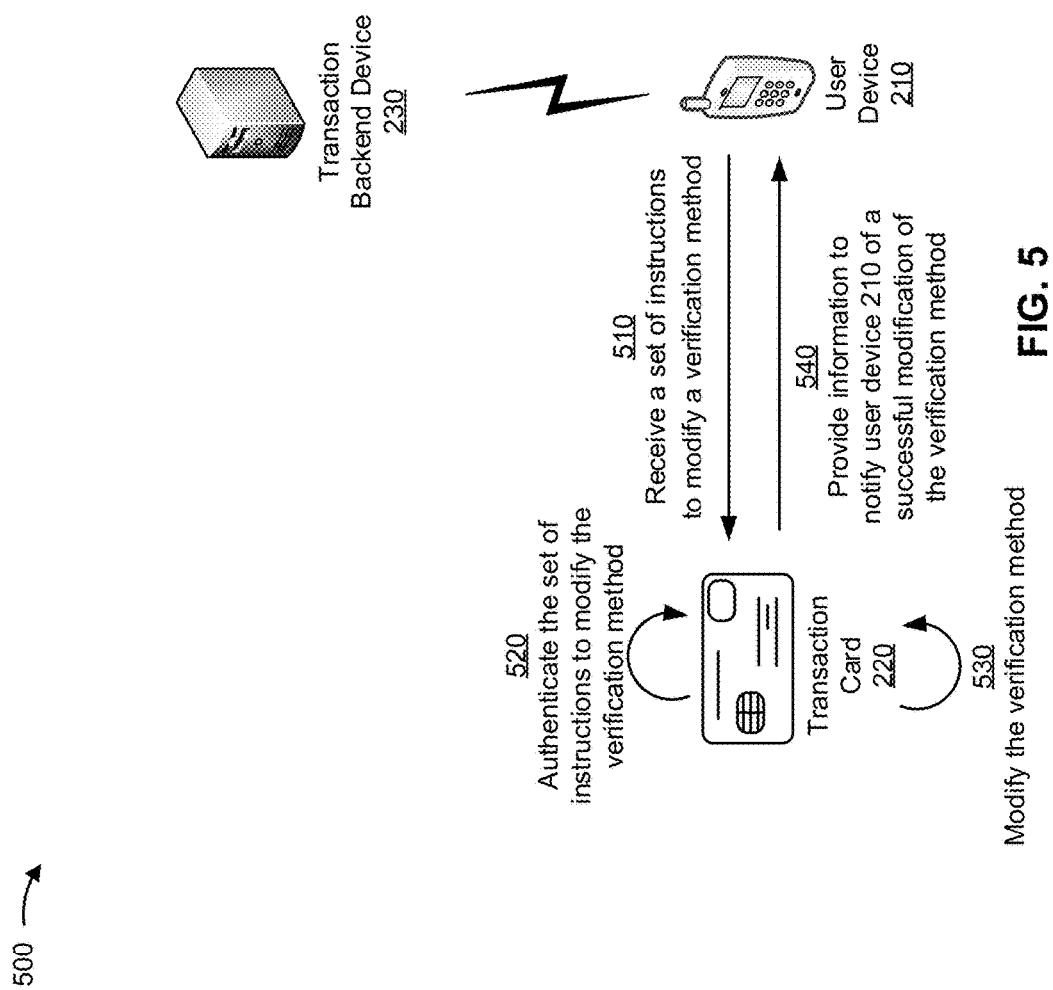
FIG. 5 is a diagram of an example implementation relating to the example process shown in FIG. 4.

FIG. 5 is a diagram of an example implementation 500 relating to example process 400 shown in FIG. 4. FIG. 5 shows an example of transaction card 220 authenticating a set of instructions to modify a verification method associated with transaction card 220.

As shown in FIG. 5, and by reference number 510, transaction card 220 may receive a set of instructions to modify a verification method associated with transaction card 220. For example, transaction card 220 may receive the set of instructions after user device 210 determines that a verification method associated with transaction card 220 is to be modified.

As shown by reference number 520, transaction card 220 may authenticate the set of instructions to modify the verification method (e.g., prior to modifying the verification method). In some implementations, transaction card 220 may authenticate the set of instructions using authentication information (e.g., biometric information, a username and password combination, a PIN, etc.) from user device 210. For example, transaction card 220 may receive authentication information input by a user of user device 210, authentication information stored on user device 210, and/or the like.

In some implementations, transaction card 220 may perform a comparison of authentication information to authenticate the set of instructions. For example, transaction card 220 may perform a comparison of authentication information received from user device 210 and authentication information that transaction card 220 is storing and may authenticate the set of instructions when a result of the comparison indicates a match. In some implementations, transaction card 220 may authenticate the set of instructions using transaction backend device 230. For example, transaction card 220 may provide authentication information received from user device 210 to transaction backend device 230 (e.g., via transaction terminal 240) to permit transaction backend device 230 to authenticate the set of instructions. Conversely, and as another example, user device 210 may provide the authentication information to transaction backend device 230 and transaction backend device 230 may provide a notification to transaction card 220 (e.g., via transaction terminal 240) that identifies whether the set of instructions is authenticated.

As shown by reference number 530, transaction card 220 may modify the verification method. For example, transaction card 220 may modify the verification method based on authenticating the set of instructions and in a manner similar to that described elsewhere herein. In some implementations, transaction card 220 may determine whether a verification method can be used prior to modifying the verification method. For example, transaction card 220 may use information stored on transaction card 220, may communicate with transaction backend device 230 (e.g., via transaction terminal 240), and/or may communicate with transaction terminal 240 to determine whether transaction card 220 can use a particular verification method (e.g., based on a geographic location of transaction card 220 and/or user device 210, a preference of an account associated with transaction card 220, and/or the like). This conserves processing resources of transaction card 220 that would otherwise be consumed attempting to configure transaction card 220 to use a verification method that transaction card 220 cannot use.

As shown by reference number 540, transaction card 220 may provide information to notify user device 210 of a successful modification of the verification method. For example, transaction card 220 may provide information for display that indicates a successful (or unsuccessful) modification of the verification method.

In this way, transaction card 220 may authenticate a set of instructions to modify a verification method, thereby increasing a security of transaction card 220 and/or conserving computing resources that would otherwise be consumed due to an erroneous modification of a verification method.

As indicated above, FIG. 5 is provided merely as an example. Other examples are possible and may differ from what was described with regard to FIG. 5.

Figure 6:
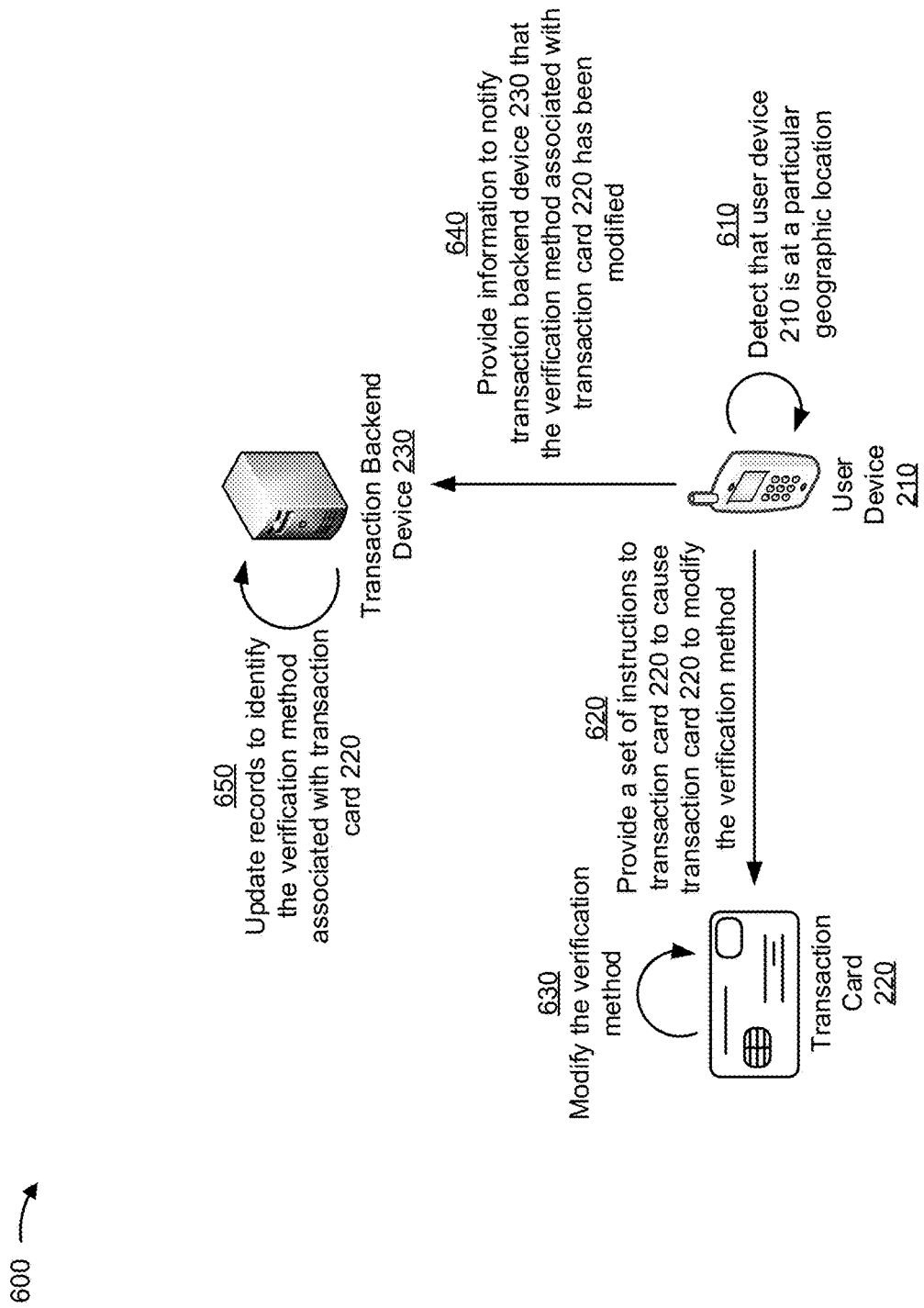
FIG. 6 is a diagram of an example implementation relating to the example process shown in FIG. 4.

FIG. 6 is a diagram of an example implementation 600 relating to example process 400 shown in FIG. 4. FIG. 6 shows an example of user device 210 determining that a verification method associated with transaction card 220 is to be modified based on a geographic location of user device 210.

As shown in FIG. 6, and by reference number 610, user device 210 may detect that user device 210 is at a particular geographic location. For example, user device 210 may determine that user device 210 is at a particular location based on information from a GPS component of user device 210 that identifies a GPS location of user device 210. In some implementations, if user device 210 is connected to transaction card 220 (e.g., wirelessly using Bluetooth or NFC), then user device 210 may determine that transaction card 220 is in the same geographic location as user device 210. In some implementations, user device 210 may determine that a verification method of transaction card 220 is to be modified based on the geographic location of user device 210. For example, different countries may use different verification methods to complete transactions and transaction card 220 may need to be configured to use a particular verification method when being used at in a particular country.

As shown by reference number 620, user device 210 may provide a set of instructions to transaction card 220 to cause transaction card 220 to modify the verification method. For example, user device 210 may provide a set of instructions similar to that described elsewhere herein. As shown by reference number 630, transaction card 220 may modify the verification method in a manner similar to that described elsewhere herein (e.g., by configuring to use a particular verification method, by enabling or disabling various verification methods, etc.).

In some implementations, transaction card 220 may verify the modification (e.g., prior to modifying the verification method). For example, transaction card 220 may provide to user device 210, for display, a message requesting confirmation of the modification from a user of user device 210, such as by requesting input from a user of user device 210 to approve or confirm a modification of a verification method. In some implementations, transaction card 220 may determine that the verification method is to be modified based on receiving the input from user device 210.

In some implementations, transaction card 220 may wait to modify the verification method until transaction card 220 is connected to transaction terminal 240. For example, this may permit transaction card 220 to communicate with transaction terminal 240 and/or transaction backend device 230 to confirm a geographic location of transaction card 220, to confirm that transaction card 220 and/or transaction terminal 240 can be configured to use a verification method, and/or the like. In some implementations, transaction card 220 may provide information to user device 210 indicating that the verification method has been successfully modified after modifying the verification method.

As shown by reference number 640, user device 210 may provide information to notify transaction backend device 230 that the verification method associated with transaction card 220 has been modified, in a manner similar to that described elsewhere herein. For example, the information may permit transaction backend device 230 to update a record associated with transaction card 220. As shown by reference number 650, transaction backend device 230 may update records to identify the verification method associated with transaction card 220, in a manner similar to that described elsewhere herein. For example, transaction backend device 230 may update a data structure to identify the verification method to which transaction card 220 was configured.

In this way, user device 210 may determine that a verification method associated with transaction card 220 is to be modified based on a geographic location of user device 210.

As indicated above, FIG. 6 is provided merely as an example. Other examples are possible and may differ from what was described with regard to FIG. 6.

Figure 7:
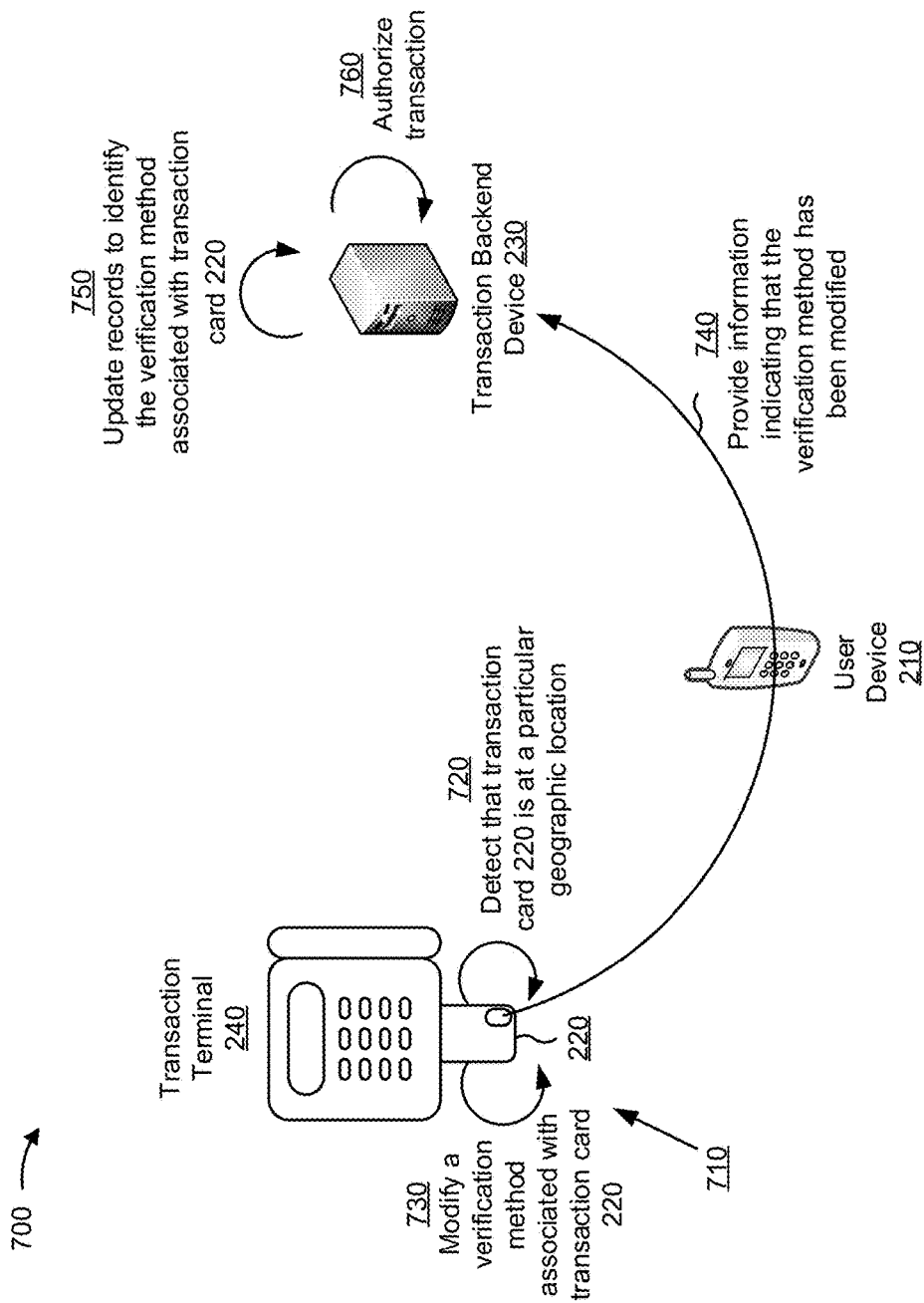
FIG. 7 is a diagram of an example implementation relating to the example process shown in FIG. 4.

FIG. 7 is a diagram of an example implementation 700 relating to example process 400 shown in FIG. 4. FIG. 7 shows an example of transaction card 220 initiating modification of a verification method associated with transaction card 220.

As shown in FIG. 7, and by reference number 710, transaction card 220 may be connected to transaction terminal 240 (e.g., in association with completing a transaction via transaction terminal 240). For example, a chip of transaction card 220 may be within communicative proximity of a chip reader of transaction terminal 240 (e.g., a chip of transaction card 220 may be inserted into a chip reader of transaction terminal 240). As shown by reference number 720, transaction card 220 may detect that transaction card 220 is at a particular geographic location. For example, transaction card 220 may receive, from transaction terminal 240 and/or user device 210, information that identifies a geographic location of transaction terminal 240 and transaction card 220 may detect that transaction card 220 is at a particular geographic location based on this information.

As shown by reference number 730, transaction card 220 may modify a verification method associated with transaction card 220, in a manner similar to that described elsewhere herein. In some implementations, transaction card 220 may determine a verification method to which to configure transaction card 220 based on information from transaction terminal 240 that identifies a verification method associated with transaction terminal 240. Additionally, or alternatively, transaction card 220 and/or transaction backend device 230 may perform a lookup to determine the verification method to which transaction card 220 is to configure (e.g., using information that identifies a geographic location of transaction card 220). In some implementations, transaction card 220 may determine whether transaction card 220 can use the verification method to which transaction card 220 is to configure (e.g., by determining whether an account associated with transaction card 220 can use the verification method). Additionally, or alternatively, transaction card 220 may communicate with transaction backend device 230 to determine whether transaction card 220 can use the verification method (e.g., by requesting that transaction backend device 230 confirm whether transaction card 220 can use the verification method).

As shown by reference number 740, transaction card 220 may provide information indicating that the verification method has been modified. For example, transaction card 220 may provide the information via user device 210. Additionally, or alternatively, transaction card 220 may provide the information via transaction terminal 240. As shown by reference number 750, transaction backend device 230 may update records to identify the verification method associated with transaction card 220, in a manner similar to that described elsewhere herein. As shown by reference number 760, transaction backend device 230 may authorize a transaction for which transaction card 220 is being used. For example, transaction backend device 230 may request, via transaction terminal 240, input of verification information (e.g., a signature, a PIN, biometric information, etc.) and may determine whether the verification information input via transaction terminal 240 and information stored by transaction backend device 230 match.

In this way, transaction card 220 may initiate modification of a verification method associated with transaction card 220.

As indicated above, FIG. 7 is provided merely as an example. Other examples are possible and may differ from what was described with regard to FIG. 7.

Figure 8:
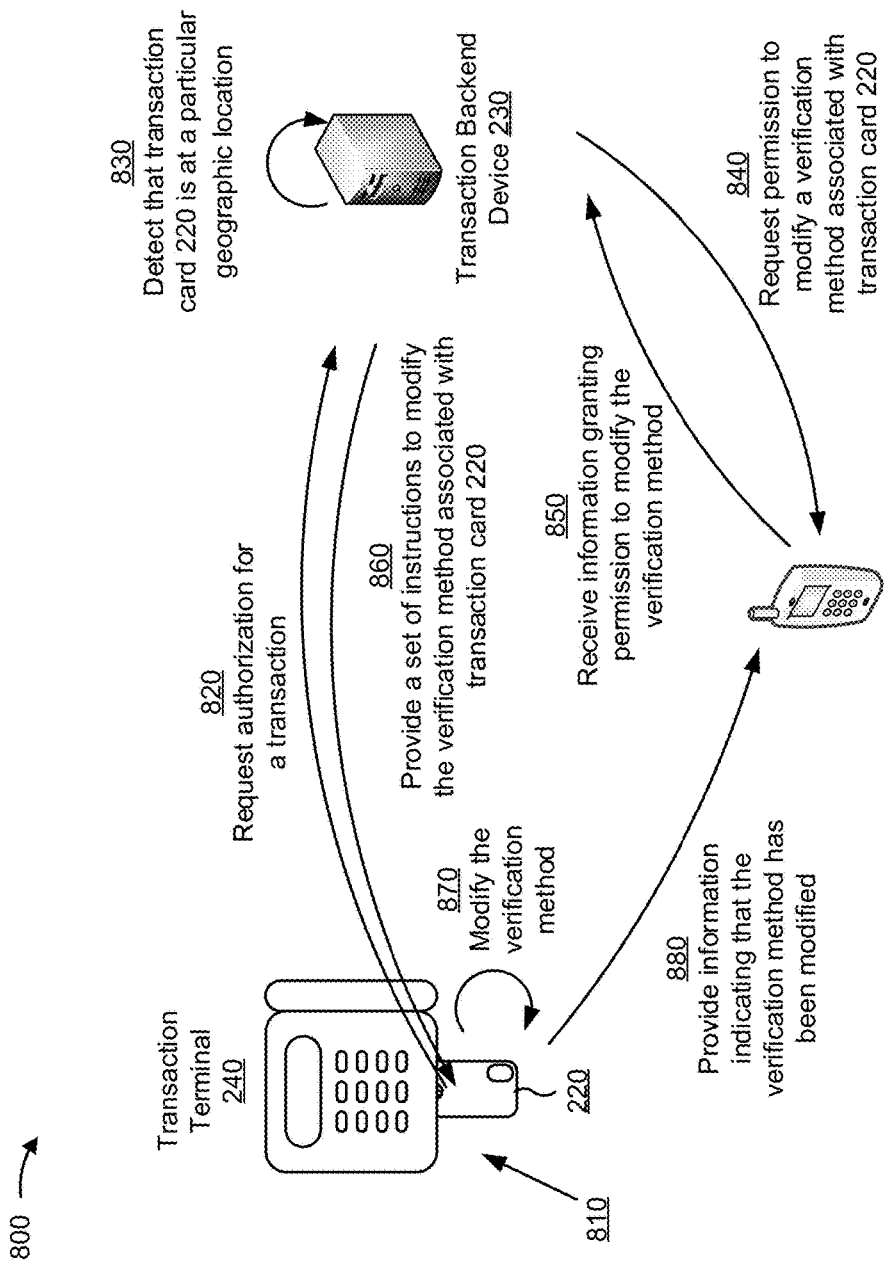
FIG. 8 is a diagram of an example implementation relating to the example process shown in FIG. 4.

FIG. 8 is a diagram of an example implementation 800 relating to example process 400 shown in FIG. 4. FIG. 8 shows an example of transaction backend device 230 determining that a verification method associated with transaction card 220 is to be modified.

As shown in FIG. 8, and by reference number 810, transaction card 220 may be connected to transaction terminal 240, in a manner similar to that described elsewhere herein (e.g., a chip of transaction card 220 and a chip reader of transaction terminal 240 may be in communicative proximity). As shown by reference number 820, transaction card 220 may request authorization for a transaction. For example, transaction card 220 may request, via transaction terminal 240, that transaction backend device 230 authorize a transaction. As shown by reference number 830, transaction backend device 230 may detect that transaction card 220 is at a particular geographic location. For example, transaction backend device 230 may detect that transaction card 220 is at a particular geographic location based on information received from transaction terminal 240 and/or transaction card 220. In some implementations, transaction backend device 230 may determine that a verification method associated with transaction card 220 is to be modified based on the particular geographic location at which transaction card 220 is located.

As shown by reference number 840, transaction backend device 230 may request permission to modify a verification method associated with transaction card 220 (e.g., from user device 210). For example, transaction backend device 230 may provide, for display, information to user device 210 that indicates that the verification method associated with transaction card 220 needs to be modified to complete the transaction and may request confirmation of the modification. As shown by reference number 850, transaction backend device 230 may receive information granting permission to modify the verification method (e.g., from user device 210). In some implementations, transaction backend device 230 may receive authentication information from user device 210 to permit transaction backend device 230 to confirm the modification.

As shown by reference number 860, transaction backend device 230 may provide a set of instructions to modify the verification method associated with transaction card 220. For example, transaction backend device 230 may provide, via transaction terminal 240, a set of instructions to cause transaction card 220 to modify a verification method associated with transaction card 220. As shown by reference number 870, transaction card 220 may modify the verification method associated with transaction card 220, in a manner similar to that described elsewhere herein. As shown by reference number 880, transaction card 220 may provide information indicating that the verification method has been modified. For example, transaction card 220 may provide information to user device 210 for display.

In this way, transaction backend device 230 may determine that a verification method associated with transaction card 220 is to be modified.

As indicated above, FIG. 8 is provided merely as an example. Other examples are possible and may differ from what was described with regard to FIG. 8.

In this way, user device 210 permits quick and easy configuration of a verification method for transaction card 220 by permitting a user to use user device 210 to modify the verification method. This increases an efficiency of re-configuring transaction card 220 to use a different verification method (e.g., to use a different protocol). In addition, this conserves network resources and/or computing resources that would otherwise be consumed modifying the verification method in a less efficient manner, such as by contacting an organization to modify a verification method. Further, this reduces or eliminates issues associated with using transaction card 220 in different locations, with different merchants, and/or the like that use different verification methods, thereby conserving computing resources of devices associated with completing a transaction that would otherwise be consumed due to a mismatch in verification methods associated with a transaction card and the different locations, different merchants, and/or the like.

Although some implementations may be described in the context of an EMV transaction (e.g., a transaction completed via an EMV chip), the implementations apply equally to other types of transactions, such as transactions that use wireless communications to complete the transactions (e.g., NFC transactions).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive user input indicating that a modification to a verification method associated with a transaction card from a first verification method to a second verification method is approved,
the first verification method and the second verification method using different types of verification information,
the transaction card being separate from the device;
determine that the verification method associated with the transaction card is to be modified based on receiving the user input indicating that the modification to the verification method is approved,
provide a set of instructions to the transaction card after determining that the verification method is to be modified,
the set of instructions to cause the transaction card to modify the verification method from the first verification method to the second verification method; and provide information identifying the modification to the verification method to a transaction backend device to notify the transaction backend device that the verification method associated with the transaction card has been modified from the first verification method to the second verification method.

2. The device of claim 1, where the first verification method is one of:
   a chip and personal identification number (PIN) method, or
   a chip and signature method; and
where the second verification method is the other of:
   the chip and PIN method, or
   the chip and signature method.

3. The device of claim 1, where the one or more processors are further to:
   detect a geographic location of the device or the transaction card; and
   where the one or more processors, when determining that the verification method is to be modified, are to:
      determine that the verification method is to be modified based on the geographic location of the device or the transaction card,
         a first geographic location being associated with the first verification method, and
         a second geographic location being associated with the second verification method.

4. The device of claim 1, where the one or more processors, when determining that the verification method is to be modified, are to:
   determine that the verification method is to be modified based on one or more of:
   information indicating that the second verification method is associated with a geographic location of the device or the transaction card, or
   information indicating that an account associated with the device has permission to modify the verification method.

5. The device of claim 1, where the set of instructions are provided to the transaction card via:
   a wireless connection between the transaction card and the device, or
   the transaction backend device.

6. The device of claim 1, where the one or more processors are further to:
   receive information identifying a location of the device or the transaction card;
   identify the second verification method, from multiple possible verification methods, to be configured for the transaction card based on the location of the device or the transaction card; and
   where the one or more processors, when providing the set of instructions, are to:
      provide the set of instructions to cause the second verification method to be configured for the transaction card based on identifying the second verification method.

7. The device of claim 1, where the one or more processors are further to:
   provide authentication information to the transaction backend device to permit the set of instructions to modify the verification method.

8. A non-transitory computer-readable medium storing instructions, the instructions comprising:
   one or more instructions that, when executed by one or more processors of a device, cause the one or more processors to:
      receive user input indicating that a modification to a verification method associated with a transaction card from a first verification method to a second verification method is approved,
      the first verification method and the second verification method using different types of verification information,
      the transaction card being separate from the device;
      determine that the verification method, is to be reconfigured from the first verification method to the second verification method based on receiving the user input indicating that the modification to the verification method is approved,
         the second verification method including:
            a chip and personal identification number (PIN) method, or
            a chip and signature method;
      provide a set of instructions to the transaction card to cause the transaction card to reconfigure from the first verification method to the second verification method,
         the set of instructions being provided to the transaction card via:
            a wireless connection between the transaction card and the device associated with the transaction card, or
            a transaction backend device; and
      provide information to the transaction backend device to notify the transaction backend device that the verification method has been reconfigured to the second verification method.

9. The non-transitory computer-readable medium of claim 8, where the one or more instructions, when executed by the one or more processors, further cause the one or more processors to:
   determine whether the transaction card is within communicative proximity of the device associated with the transaction card; and
   where the one or more instructions, that cause the one or more processors to provide the set of instructions, cause the one or more processors to:
      provide the set of instructions to the transaction card via the wireless connection when the transaction card is within communicative proximity of the device, or
      provide the set of instructions to the transaction card via the transaction backend device when the transaction card is not within communicative proximity of the device.

10. The non-transitory computer-readable medium of claim 8, where the one or more instructions, when executed by the one or more processors, further cause the one or more processors to:
    provide authentication information to the transaction backend device to permit the set of instructions to modify the verification method.

11. The non-transitory computer-readable medium of claim 8, where the one or more instructions, that cause the one or more processors to determine that the verification method is to be modified, cause the one or more processors to:
    determine that the verification method is to be modified based on information identifying a user preference of a user of the device associated with the transaction card,
    wherein the user preference prioritizes the second verification method over another verification method.

12. The non-transitory computer-readable medium of claim 8, where the one or more instructions, when executed by the one or more processors, further cause the one or more processors to:

prevent the set of instructions from being provided until the transaction card is within communicative proximity of the device.

13. The non-transitory computer-readable medium of claim 8, where the one or more instructions, that cause the one or more processors to determine that the verification method is to be modified, cause the one or more processors to:

determine that the verification method is to be modified based upon information indicating that an account associated with the device has permission to modify the verification method.

14. A method, comprising:

receiving, by a device, user input indicating that a modification to a verification method associated with a transaction card from a first verification method to a second verification method is approved,
the first verification method and the second verification method using different types of verification information,
the transaction card being separate from the device;

determining, by the device, that the verification method, is to be modified based on receiving the user input indicating that the modification to the verification method is approved;

providing, by the device, a set of instructions to the transaction card to cause the transaction card to reconfigure from the first verification method to the second verification method; and providing, by the device, information to a transaction backend device to notify the transaction backend device that the verification method associated with the transaction card has been modified from the first verification method to the second verification method.

15. The method of claim 14, where determining that the verification method is to be modified comprises:

determining that the verification method is to be modified based on receiving transaction terminal information from the transaction card when the transaction card is communicatively coupled to a transaction terminal.

16. The method of claim 14, where determining that the verification method is to be modified comprises:

determining that the verification method is to be modified based on receiving transaction backend information from the transaction backend device when the transaction card is used to complete a transaction.

17. The method of claim 14, where the verification method includes:

a chip and personal identification number (PIN) method,
a chip and signature method, or
a biometric verification method.

18. The method of claim 14, where the set of instructions cause the transaction card to disable the verification method and enable a different verification method.

19. The method of claim 14, where determining that the verification method is to be modified comprises:

determining that the verification method is to be modified based on a request from the transaction card to modify the verification method.

20. The method of claim 14, further comprising:

providing authentication information to the transaction backend device to permit the set of instructions to modify the verification method.

* * * * *